June 30, 1970  G. R. MUELLER  3,517,719
TIRE AND CHAIN COMBINATION
Filed April 29, 1968  2 Sheets-Sheet 1
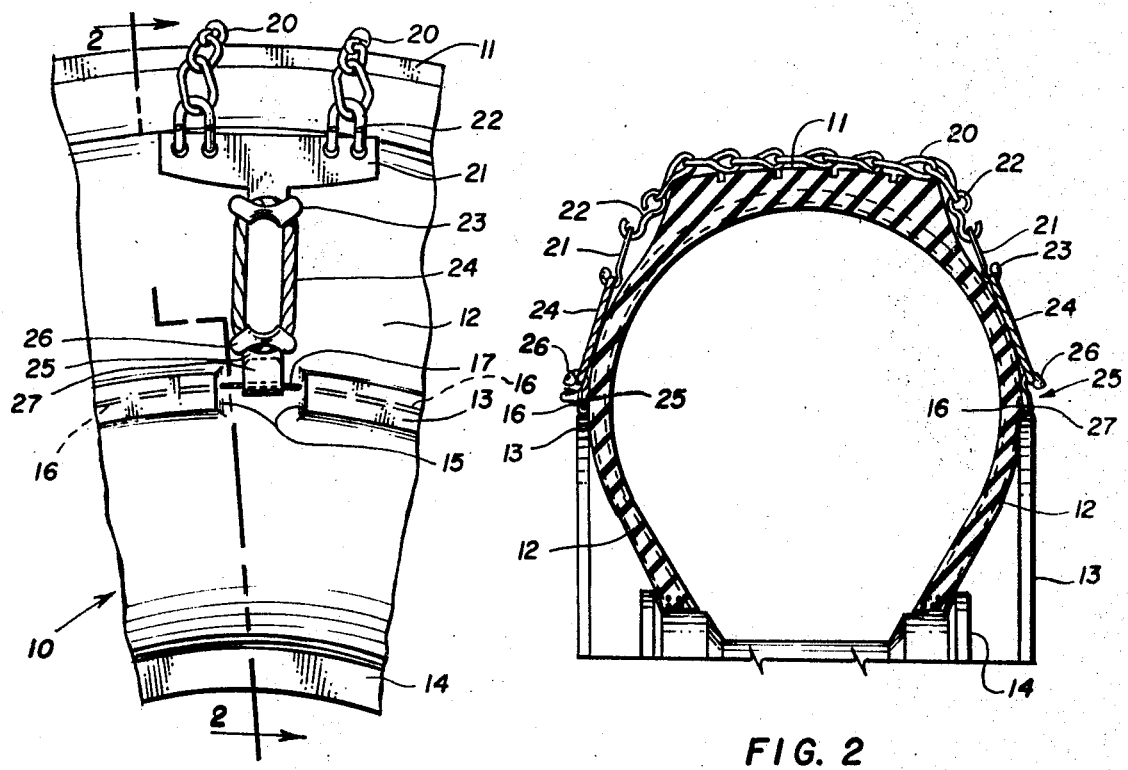
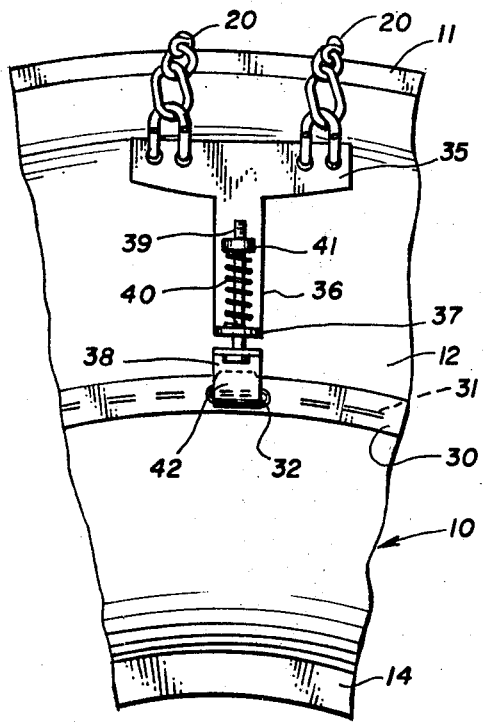
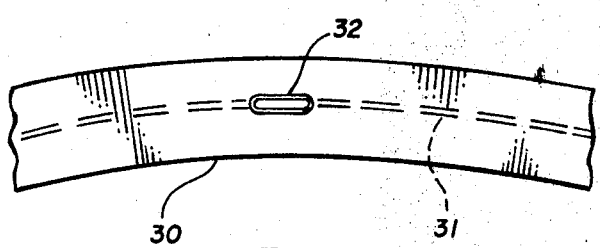
FIG. 1
FIG. 2
FIG. 3
FIG. 4
INVENTOR.
Gerhard R. Mueller
BY
Bertha L. MacGregor
ATTORNEY June 30, 1970   G. R. MUELLER   3,517,719
TIRE AND CHAIN COMBINATION Filed April 29, 1968   2 Sheets-Sheet 2

INVENTOR.
Gerhard R. Mueller
BY
Bertha L. MacGregor
ATTORNEY

# United States Patent Office 3,517,719
Patented June 30, 1970

3,517,719
TIRE AND CHAIN COMBINATION
Gerhard R. Mueller, 5520 E. Vassar Ave.,
Denver, Colo. 80222
Filed Apr. 29, 1968, Ser. No. 725,069
Int. Cl. B60c *11/00*
U.S. Cl. 152—223                                      7 Claims

ABSTRACT OF THE DISCLOSURE

A vehicle tire and anti-slip device combination which comprises a tire provided with integrally formed mounting means and anti-slip devices which include flexible yielding members and means for quickly and easily detachably connecting the members to the mounting means of the tire. The mounting means comprises a cable-covering annular lip on the external surfaces of the tire sides. The lip may be formed in circumferentially spaced apart sections, between which the cable is exposed, or the lip may be continuous and provided with marking means at intervals to indicate the location of the cable. The marked area is designed to be cut away to expose the cable for attachment of the anti-slip device thereto.

---

This invention relates to anti-slip devices for motor vehicles, and more particularly to an improved tire and chain combination. The invention may be embodied in anti-skid devices applied to automobile tires of normal or radial wall construction. The tire walls are provided with mounting means integrally formed in the side walls.

In one embodiment of the invention, the mounting means comprise an annular lip on each side wall of the tire, and an annular cable in the tire located inwardly of the lip. The lip is formed in circumferentially spaced apart sections and the cable is exposed between the ends of adjacent sections. In another embodiment of the invention, the lip is continuous and is marked in circumferentially spaced apart areas to indicate the location of the cable beneath the outer surface of the lip for the purpose of facilitating the cutting away of the lip in those areas to expose parts of the cable for attachment thereto of the anti-slip member of the combination. Still another embodiment of the invention comprises short lengths of lips integrally formed with the tire, and a cable which is attachable to the short lips but is not integrally located in the tire walls. In this embodiment, the cable can be attached when needed as part of mounting means for the anti-slip members of the combination, and can be removed when the anti-slip members are not being used.

An object of the invention is to provide anti-slip devices which are flexible and include yielding means which facilitate easy installation. The yielding means preferably is flexible material having a degree of elasticity, such as rubber, which has the added advantage that it can be produced by tire manufacturers. The flexible material may be a coiled spring. The construction of the anti-slip device and mounting means is such that the device can be installed by a user working from one side only of the tire.

Another object of the invention is the provision of mounting means in the tire which does not interfere with or affect the conventional production of tires, but which, nevertheless, serves to strengthen and reinforce such conventional tires whether being used to mount the anti-slip devices or not.

Other objects and advantages will become apparent from the drawings and following description.

In the drawings:

FIG. 1 is an elevational side view of a portion of a tire embodying my anti-slip mounting means and showing one of the anti-slip devices attached thereto.

FIG. 2 is a transverse sectional view in the plane of the line 2—2 of FIG. 1.

FIG. 3 is a view similar to FIG. 1, showing a modified arrangement of the mounting means and a modification of the anti-slip device attached thereto.

FIG. 4 is a fragmentary view showing the modified arrangement of the mounting means of FIG. 3 before the outer covering layer of the tire has been cut away to expose the mounting means.

Figure 5:
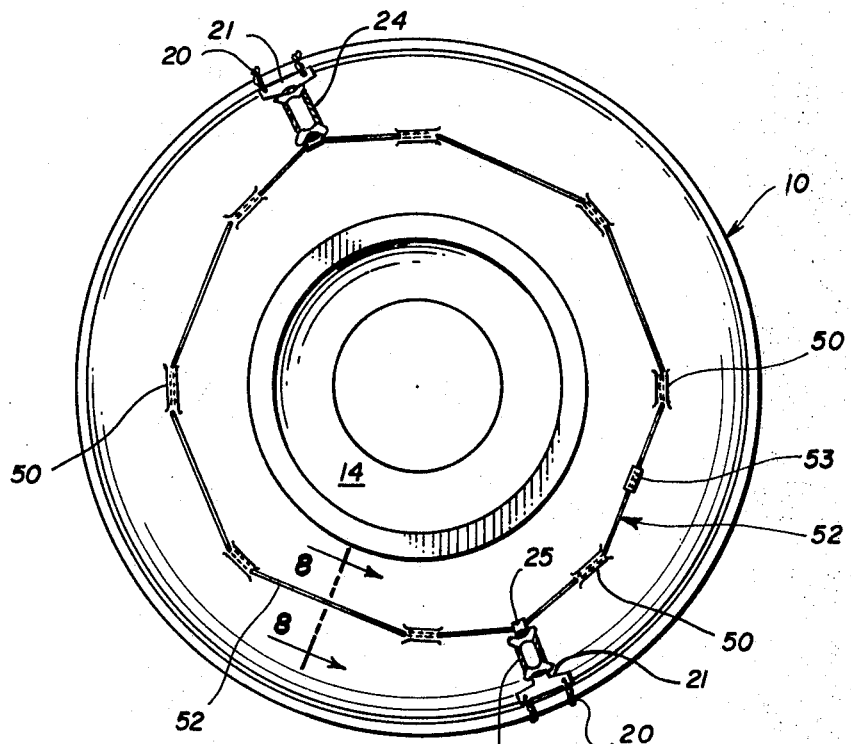
FIG. 5 is an elevational side view of a modified form of tire and chain combination, in which the tire is provided with short lengths of integrally formed lips, and a cable is detachably and removably inserted in the lip sections, the anti-slip members of the combination being attached to parts of the cable exposed between the lip sections.

Referring to FIGS. 1 and 2, a vehicle tire 10 comprises a tread 11 and side walls 12, which may be of any conventional construction. The side walls 12 are provided integrally with a thickened annular lip 13 which extends outwardly from each side of the tire approximately midway between the tread 11 and rim 14. Each lip 13 is non-continuous, being integrally formed on the side walls of the tire in sections which have their ends spaced apart as indicated at 15. Each of the lips 13 has embedded therein one or more cables 16 which are continuous and extend through the several sections of each lip and across the spaces between them, whereby short portions 17 of each cable 16 are exposed between the ends 15 of the lips.

The preferred form of anti-slip device shown in FIGS. 1 and 2 comprises a pair of chain members 20 each attached at its ends to an attachment plate 21 by hooks 22 or other suitable means; a yielding endless band 24 attached to the plate 21 by a molded metal hook 23. The band 24 has attached to it a generally S-form of hook 25 of molded metal with thickened tip 26 engaging the band 24. The portion 27 of the hook 25 is a flat hook designed to securely but detachably engage the cable or cables 16 in the area 17 which is exposed between the ends 15 of the lip sections 13.

In the embodiment of the invention shown in FIGS. 3 and 4, the tire 10, tread 11 and side walls 12 have been similarly designated as in FIG. 1. The lip described in connection with FIGS. 3 and 4 differs from the construction 13 described, in that the lip 30 of FIG. 3 is continuous and the cable 31 is not initially exposed. The cable 31 is annular in form and extends continuously around each side wall of the tire as heretofore described, about midway between the tread and rim. The layer of tire material in the lip 30 which covers the cable 31 is a thin layer, marked as shown in FIG. 4 a 32 to indicate the location of the underlying cable 31 at spaced apart areas where it is desirable to attach the anti-slip device. The marking 32 may consist of a slightly raised or thickened part of the lip or some contrasting color or other means of indicating the location of the cable 31. The user of the tire of FIG. 3 may expose the cable by cutting away a small piece of the lip 30 in the area 32 when he desires to attach the anti-slip device, or he may use the tire without exposing the cable 31.

The anti-slip device shown in FIG. 3 differs from the device shown in FIG. 1 as hereinafter pointed out, but either form may be applied to the tire of either FIG. 1 or 3. In the anti-slip device of FIG. 3, the chains 20 are attached to an attachment plate 35 which has an elongated arm 36 and integral flange 37. The attachment plate is adjustably connected to a hook 38 by a bolt 39 which extends through the flange 37 and hook 38 and is surrounded by a spring 40 bearing at one end on a nut 41 on the bolt and at the other end against the flange 37. The hook 38 has a flat terminal hook member 42 which is designed to engage the cable 30 of FIG. 3 or the cable 16 of FIG. 1.

Figures 6, 7:
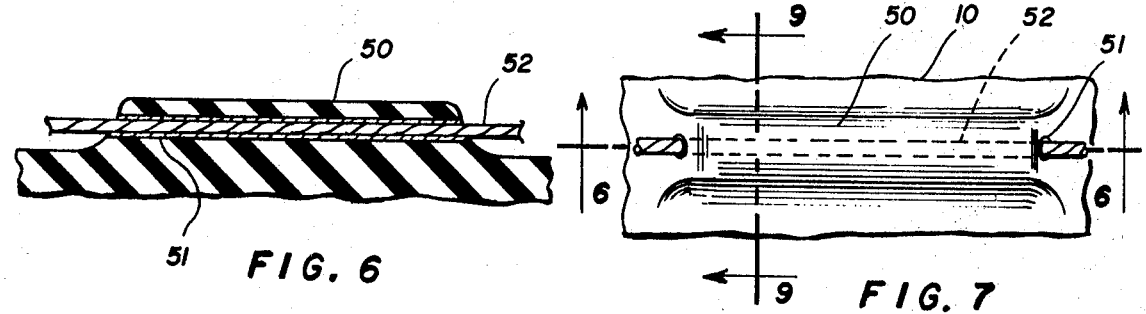
FIG. 6 is a sectional view in the plane of the line 6—6 of FIG. 7.
FIG. 7 is an enlarged elevational view of part of the tire side wall and one of the short lip sections of FIG. 5, showing the cable extending through the lip.
Figures 8, 9:
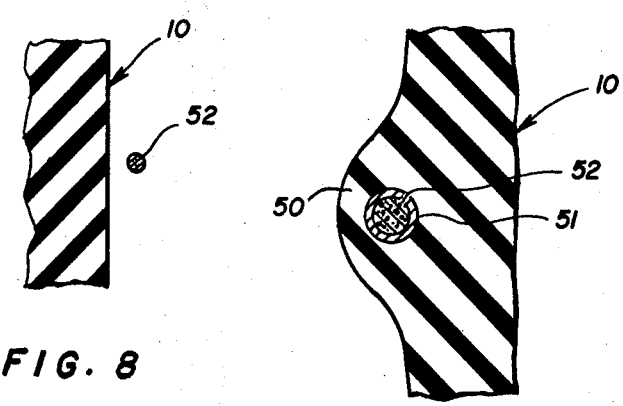
FIG. 8 is a sectional view, on an enlarged scale, in the plane of the line 8—8 of FIG. 5.
FIG. 9 is a sectional view, on an enlarged scale, in the plane of the line 9—9 of FIG. 7.

Referring to the modification shown in FIGS. 5–9, the tire 10 is provided with integrally formed short lengths of lips 50 in which are embedded short lengths of tubing 51 open at opposite ends for reception of the cable or cables 52. The ends of the cable or cables 52 are detachably connected together by a cable lock 53. The cable 52 is inserted through the series of short lips 50, leaving the major length of the cable exposed on each side of the tire, accessible for attachment thereto of the anti-slip devices which may be those shown in FIG. 1 indicated at 20–27 or the modification shown in FIG. 3 indicated at 20 and 35–42. When anti-slip devices are not needed, the cable and the devices can be removed.

The anti-slip devices of FIGS. 1 and 3 may be used with any of the mounting means shown and described herein. The tires provide with the mounting means of FIGS. 3 and 4 may be used without exposing the mounting cables. This feature makes the tires acceptable to buyers who do not need anti-slip devices on their vehicle tires. However, if anti-slip devices should be needed at any time, the mounting cables can be exposed quickly and easily by cutting away the thin layer of the marked area indicated at 32 in FIG. 4. The lips 13, 30 and 50 are unobtrusive and free of loops or projecting parts which detract from the accepted appearance of conventional tires.

Changes may be made in details of construction of the anti-slip devices and mounting means without departing from the scope of the invention as defined by the appended claims.

I claim:

1. A tire and chain combination comprising
   (a) a tire provided with an annularly extending lip on each of its side walls, said tire and lips being integrally formed and the lips being made of the same material as the side walls of the tire,
   (b) an annularly disposed cable at least partially covered and retained by the lip on each side of the tire, and
   (c) a plurality of anti-slip devices each comprising a chain, a pair of cable engaging members, and intermediate attachment members connecting the chain at opposite ends to said cable engaging members.

2. The tire and chain combination defined by claim 1, in which the annularly extending lip on each of the tire side walls is continuous and conceals the cable, and said lip is marked on spaced apart areas to indicate the location of the cable, whereby cutting away of the marked area of the lip exposes the cable for atttachment of the anti-slip devices to said exposed parts of the cable.

3. The tire and chain combination defined by claim 1, in which the annularly extending lip on each tire side wall consists of short spaced apart sections, and includes metal tubing extending longitudinally in each lip section, said annularly disposed cable being inserted through the tubing in a plurality of lip sections on a tire side wall and includes means for locking the cable ends together, the parts of the cable between lip sections being exposed for attachment of the anti-slip devices to said exposed parts.

4. The tire and chain combination defined by claim 1, in which the intermediate attachment member connecting the chain to the cable engaging member comprises an attachment plate connected to the chain member and an endless elastic band attached to the attachment plate and to the cable engaging member.

5. The tire and chain combination defined by claim 1, in which the intermediate attachment member connecting the chain to the cable engaging member comprises an attachment plate, a metal loop connected to the plate and to the chain, a hook formed on the plate, an endless rubber band engaging the hook on the attachment plate, and an S-form of hook engaging the endless band and the cable.

6. A tire and chain combination comprising
   (a) a tire provided with annularly extending, integrally formed lip sections on each of its side walls, said lip sections extending only slightly outwardly of the side wall surface and unobtrusive in appearance,
   (b) an annularly disposed cable embedded in the tire side wall inwardly of said lip sections and exposed between the proximate ends of said sections, and
   (c) a plurality of anti-slip devices each comprising a chain, a pair of cable engaging members, and intermediate attachment members connecting the chain at opposite ends to said cable engaging members, said cable engaging members being hook-form to detachably engage the exposed parts of the cable between the proximate ends of said lip sections.

7. A tire and chain combination comprising
   (a) a tire provided with an annularly extending noncontinuous lip on each of its side walls,
   (b) an annularly disposed cable at least partially covered and retained by the lip on each side of the tire, said cable being exposed between the proximate ends of the lip sections, and
   (c) a plurality of anti-slip devices each comprising a chain and a pair of cable engaging members connected to opposite ends of the chain for attachment of the anti-slip devices to the exposed parts of the cable.

References Cited

UNITED STATES PATENTS 2,415,583  2/1947  Eddy _____ 152—242
2,444,573  7/1948  Mank _____ 152—242

ARTHUR L. LA POINT, Primary Examiner

C. B. LYON, Assistant Examiner

U.S. Cl. X.R.
152—233